(12) United States Patent
Langfermann

(10) Patent No.: US 10,842,134 B2
(45) Date of Patent: Nov. 24, 2020

(54) FEEDING DEVICE FOR POULTRY ANIMALS

(71) Applicant: BIG DUTCHMAN INTERNATIONAL GmbH, Vechta (DE)

(72) Inventor: Judith Langfermann, Rechterfeld (DE)

(73) Assignee: BIG DUTCHMAN INTERNATIONAL GMBH, Vechta (DE)

(*) Notice: Subject to any disclaimer, the term of this patent is extended or adjusted under 35 U.S.C. 154(b) by 713 days.

(21) Appl. No.: 15/713,745

(22) Filed: Sep. 25, 2017

(65) Prior Publication Data
US 2018/0084762 A1    Mar. 29, 2018

(30) Foreign Application Priority Data

Sep. 27, 2016 (DE) .................. 20 2016 105 370 U

(51) Int. Cl.
| | |
|---|---|
| *A01K 39/012* | (2006.01) |
| *A01K 39/00* | (2006.01) |
| *A01K 39/014* | (2006.01) |
| *A01K 39/01* | (2006.01) |

(52) U.S. Cl.
CPC ........ *A01K 39/014* (2013.01); *A01K 39/0106* (2013.01); *A01K 39/0125* (2013.01)

(58) Field of Classification Search
CPC .. A01K 39/0125; A01K 39/014; A01K 39/01; A01K 39/012
USPC ... 119/52.1, 56.2, 57, 57.1, 57.2, 57.4, 57.5, 119/58
See application file for complete search history.

(56) References Cited

U.S. PATENT DOCUMENTS

| | | | |
|---|---|---|---|
| 503,664 | A | 8/1893 | Jones |
| 2,074,383 | A | 3/1937 | Funk |
| 2,149,686 | A | 3/1939 | Rivenburgh |
| 2,808,029 | A | 10/1957 | Geerlings |
| 2,842,096 | A | 7/1958 | Bradfield |
| 2,884,899 | A | 5/1959 | Jackes et al. |
| 2,969,867 | A | 1/1961 | McClelland |
| 3,102,511 | A | 9/1963 | Atcheson |
| 3,139,065 | A | 6/1964 | Willauer, Jr. |
| 3,145,793 | A | 8/1964 | Ray |

(Continued)

FOREIGN PATENT DOCUMENTS

| | | |
|---|---|---|
| AU | 1715083 | 8/1982 |
| CH | 485 202 | 1/1970 |

(Continued)

*Primary Examiner* — Yvonne R Abbott-Lewis
(74) *Attorney, Agent, or Firm* — Price Heneveld LLP

(57) ABSTRACT

A feeding device for poultry animals having an upper feed provision element with an elongated expansion disposed so that poultry animals can reach the feed in the upper feed provision element from the access platform. The feeding device having at least one lower feed provision element disposed underneath the upper feed provision element during operation, wherein the lower feed provision element is arranged and designed so that during operation poultry animals can reach the feed in the lower feed provision element from a floor, and wherein the lower feed provision element is arranged and designed so that the lower feed provision element is supplied with feed provided in the upper feed provision element.

16 Claims, 2 Drawing Sheets

(56) References Cited

U.S. PATENT DOCUMENTS

| | | |
|---|---|---|
| 3,215,252 A | 11/1965 | Wilkes |
| 3,268,067 A | 8/1966 | Prentice et al. |
| 3,319,762 A | 5/1967 | Rose |
| 3,388,690 A | 6/1968 | Hostetler |
| 3,427,929 A | 2/1969 | Dawson |
| 3,511,215 A | 5/1970 | Myers |
| 3,696,584 A | 10/1972 | Rickard |
| 3,722,743 A | 3/1973 | Atchley |
| 3,738,077 A | 6/1973 | Leach |
| 3,759,368 A | 9/1973 | Rose et al. |
| 3,770,107 A | 11/1973 | Michelbach |
| 3,811,412 A * | 5/1974 | Murto .............. A01K 39/0125 119/53 |
| 3,898,435 A | 8/1975 | Pritchard et al. |
| 3,911,868 A | 10/1975 | Brembreck |
| 3,966,049 A | 6/1976 | van den Berg |
| 3,968,904 A | 7/1976 | Neville |
| 3,997,388 A | 12/1976 | Simon |
| 4,070,990 A | 1/1978 | Swartzendruber |
| 4,086,998 A | 5/1978 | van der Schoot |
| RE29,944 E | 3/1979 | Hyer et al. |
| 4,159,696 A | 7/1979 | Martin |
| 4,199,051 A | 4/1980 | Kimberley |
| 4,216,742 A | 8/1980 | Kirchhofer |
| 4,226,211 A | 10/1980 | Barrentine |
| 4,253,120 A | 2/1981 | Levine |
| 4,345,682 A | 8/1982 | White et al. |
| 4,348,988 A | 9/1982 | Lawson |
| 4,401,057 A | 8/1983 | Van Gilst |
| 4,416,218 A | 11/1983 | Holz |
| 4,418,773 A | 12/1983 | Finet et al. |
| 4,476,811 A | 10/1984 | Swartzendruber |
| 4,527,513 A | 7/1985 | Hart et al. |
| 4,542,808 A | 9/1985 | Lloyd, Jr. et al. |
| 4,552,095 A | 11/1985 | Segalla |
| 4,575,993 A | 3/1986 | Meyn |
| 4,603,657 A | 8/1986 | Peckskamp |
| 4,675,520 A | 6/1987 | Harrsen et al. |
| 4,676,197 A | 6/1987 | Hoover |
| 4,846,337 A | 7/1989 | Kuhlmann |
| 4,863,009 A | 9/1989 | Winkel et al. |
| 4,868,901 A | 9/1989 | Kniskern et al. |
| 4,959,040 A | 9/1990 | Gardner |
| 4,995,343 A | 2/1991 | Cole et al. |
| 5,007,380 A | 4/1991 | Badia et al. |
| 5,046,570 A | 9/1991 | Emme et al. |
| 5,092,274 A * | 3/1992 | Cole .............. A01K 39/0125 119/57.4 |
| 5,097,797 A | 3/1992 | Van Zee et al. |
| 5,101,765 A | 4/1992 | Manfrin |
| 5,101,766 A | 4/1992 | Runion |
| 5,113,797 A | 5/1992 | van Daele |
| 5,119,893 A | 6/1992 | Jost |
| 5,165,514 A | 11/1992 | Faulkner |
| 5,222,589 A | 6/1993 | Gordon |
| 5,232,080 A | 8/1993 | van Essen et al. |
| 5,275,131 A | 1/1994 | Brake et al. |
| 5,304,745 A | 4/1994 | Rusk et al. |
| 5,311,839 A | 5/1994 | Pollock et al. |
| 5,311,977 A | 5/1994 | Dean et al. |
| 5,365,717 A | 11/1994 | McKinlay |
| 5,406,907 A * | 4/1995 | Hart .............. A01K 39/0125 119/53 |
| 5,435,267 A | 7/1995 | Patterson |
| 5,462,017 A | 10/1995 | Pollock et al. |
| 5,490,591 A | 2/1996 | Faulkner |
| 5,497,730 A | 3/1996 | van Daele et al. |
| 5,551,822 A | 9/1996 | Pippin et al. |
| 5,603,285 A | 2/1997 | Kleinsasser |
| 5,642,688 A | 7/1997 | Bannier et al. |
| 5,718,187 A | 2/1998 | Pollock et al. |
| 5,736,682 A | 4/1998 | Heitmann et al. |
| 5,762,021 A | 6/1998 | Horwood et al. |
| 5,765,503 A * | 6/1998 | van Daele .............. A01K 39/0125 119/52.4 |
| 5,778,821 A | 7/1998 | Horwood et al. |
| 5,794,562 A * | 8/1998 | Hart .............. A01K 39/0125 119/52.4 |
| 5,875,733 A * | 3/1999 | Chen .............. A01K 39/0125 119/53 |
| 5,884,581 A | 3/1999 | van Daele |
| 5,927,232 A * | 7/1999 | Pollock .............. A01K 39/0125 119/53 |
| 5,941,193 A | 8/1999 | Cole |
| 5,957,083 A | 9/1999 | Cheng |
| 5,964,185 A | 10/1999 | Debonne et al. |
| 5,967,083 A | 10/1999 | Kleinsasser |
| 6,050,220 A | 4/2000 | Kimmel et al. |
| 6,056,109 A | 5/2000 | Hidai et al. |
| 6,066,809 A | 5/2000 | Campbell et al. |
| 6,152,078 A | 11/2000 | Romeu Guardia |
| 6,173,676 B1 | 1/2001 | Cole |
| 6,211,470 B1 | 4/2001 | Beran et al. |
| 6,223,552 B1 | 5/2001 | Zimmerbauer |
| 6,317,656 B1 | 11/2001 | Kira |
| 6,382,404 B1 | 5/2002 | Guldenfels |
| 6,383,068 B1 | 5/2002 | Tollett et al. |
| 6,394,031 B1 | 5/2002 | Moller |
| 6,401,936 B1 | 6/2002 | Isaacs et al. |
| 6,407,523 B1 | 6/2002 | Allan |
| 6,412,439 B1 | 7/2002 | Otto-Lubker |
| 6,470,826 B2 | 10/2002 | Thuline |
| 6,484,886 B1 | 11/2002 | Isaacs et al. |
| 6,539,893 B1 | 4/2003 | Otto-Lubker |
| 6,625,960 B1 | 9/2003 | Nambu |
| 6,655,317 B1 * | 12/2003 | Steudler, Jr. .............. A01K 39/0125 119/53 |
| 6,732,851 B2 | 5/2004 | Wienken |
| 6,779,488 B2 | 8/2004 | Corti et al. |
| 7,191,895 B2 | 3/2007 | Zeitler |
| 7,228,817 B2 | 6/2007 | Busse |
| 7,279,645 B1 | 10/2007 | Inglin |
| 7,552,697 B2 | 6/2009 | Busse |
| 7,573,567 B2 | 8/2009 | Hershtik |
| 7,878,391 B2 | 2/2011 | Kalkhoff |
| 8,033,248 B2 * | 10/2011 | Cole .............. A01K 39/0125 119/53 |
| 8,074,601 B2 * | 12/2011 | Van de Ven .............. A01K 39/0125 119/52.4 |
| 8,127,916 B2 | 3/2012 | Mix |
| 8,168,897 B2 | 5/2012 | Sudkamp |
| 8,360,230 B2 | 1/2013 | Rompe |
| 8,590,695 B2 | 11/2013 | Moreno Rueda |
| 9,907,294 B2 * | 3/2018 | Otto-Luebker .............. A01K 39/01 |
| 2002/0152965 A1 | 10/2002 | Turner et al. |
| 2003/0192774 A1 | 10/2003 | Cotter et al. |
| 2004/0112713 A1 | 6/2004 | Haan et al. |
| 2005/0063513 A1 | 3/2005 | Hsieh et al. |
| 2005/0150747 A1 | 7/2005 | Menendez |
| 2005/0217963 A1 | 10/2005 | Scott |
| 2006/0039586 A1 | 2/2006 | Bickert et al. |
| 2008/0251357 A1 | 10/2008 | Kawakami |
| 2009/0020395 A1 | 1/2009 | Accettura |
| 2009/0045029 A1 | 2/2009 | Deur |
| 2010/0294624 A1 | 11/2010 | Warner |
| 2011/0062000 A1 | 3/2011 | Yamamoto |
| 2012/0160637 A1 | 6/2012 | Itoh et al. |
| 2012/0181150 A1 | 7/2012 | Damm |
| 2013/0014704 A1 | 1/2013 | Kuking |
| 2013/0092512 A1 | 4/2013 | Buschmann et al. |
| 2013/0206549 A1 | 8/2013 | Clevers et al. |
| 2013/0299317 A1 | 11/2013 | Moller |
| 2015/0164051 A1 | 6/2015 | Otto-Luebker |

FOREIGN PATENT DOCUMENTS

| | | |
|---|---|---|
| CN | 204888345 | 12/2015 |
| DE | 5 25 996 | 6/1931 |
| DE | 1 820 785 | 8/1960 |
| DE | 1 124 872 | 3/1962 |
| DE | 1181482 | 11/1964 |
| DE | 1 607 143 | 9/1965 |
| DE | 1 406 150 | 3/1969 |

(56) References Cited

FOREIGN PATENT DOCUMENTS

| | | |
|---|---|---|
| DE | 7 102 326 | 9/1971 |
| DE | 2 155 120 | 5/1972 |
| DE | 2 157 774 | 5/1974 |
| DE | 2 313 663 | 10/1974 |
| DE | 2 350 555 | 4/1975 |
| DE | 2403831 | 8/1975 |
| DE | 118 839 | 3/1976 |
| DE | 2 612 594 | 9/1977 |
| DE | 2 802 542 | 7/1979 |
| DE | 3 138 748 | 4/1983 |
| DE | 3 326 706 | 2/1984 |
| DE | 3 332 240 | 3/1985 |
| DE | 34 19 883 | 11/1985 |
| DE | 3 445 429 | 6/1986 |
| DE | 3 525 460 | 2/1987 |
| DE | 3 607 858 | 9/1987 |
| DE | 4 036 112 | 4/1994 |
| DE | 43 13 456 | 5/1994 |
| DE | 43 05 559 | 8/1994 |
| DE | 4 411 776 | 10/1995 |
| DE | 195 46 626 | 6/1997 |
| DE | 196 07 258 | 8/1997 |
| DE | 197 07 155 | 8/1997 |
| DE | 198 51 793 | 11/1998 |
| DE | 198 07 231 | 9/1999 |
| DE | 199 12 821 | 11/1999 |
| DE | 199 06 916 | 8/2000 |
| DE | 19948057 | 4/2001 |
| DE | 101 06 206 | 8/2002 |
| DE | 101 64 100 | 4/2003 |
| DE | 101 64 122 | 5/2003 |
| DE | 203 15 118 | 2/2004 |
| DE | 20 2004 003 194 | 3/2004 |
| DE | 102 48 875 | 4/2004 |
| DE | 102 55 072 | 6/2004 |
| DE | 202004003194 | 6/2004 |
| DE | 699 24 866 | 3/2006 |
| DE | 2006 003 445 | 8/2007 |
| DE | 2006 004 894 | 8/2007 |
| DE | 20 2007 008 362 | 9/2007 |
| DE | 20 2007 009 477 | 9/2007 |
| DE | 20 2006 007 875 | 10/2007 |
| DE | 20 2008 003 498 | 10/2008 |
| DE | 10 2009 055 952 | 6/2011 |
| DE | 20 2010 016 688 | 5/2012 |
| DE | 20 2012 004 330 | 7/2012 |
| DE | 20 2012 004 008 | 8/2012 |
| DE | 10 2012 003987 | 8/2013 |
| DE | 20 2012 010 170 | 3/2014 |
| DE | 20 2012 010 693 | 3/2014 |
| DE | 20 2012 010 694 | 3/2014 |
| DE | 20 2014 000 575 | 4/2014 |
| DE | 20 2013 001 238 | 7/2014 |
| DE | 202013010980 | 3/2015 |
| DE | 20 2013 010 980 | 4/2015 |
| DE | 20 2015 102 303 | 7/2015 |
| EA | 2010 70867 | 2/2011 |
| EP | 0 287 874 | 10/1988 |
| EP | 0 105 571 | 6/1989 |
| EP | 0 387 242 | 9/1990 |
| EP | 0 414 487 | 2/1991 |
| EP | 0 421 553 | 4/1991 |
| EP | 0 718 218 A2 | 6/1996 |
| EP | 0 891 704 | 1/1999 |
| EP | 0 892 254 A1 | 1/1999 |
| EP | 1 077 026 | 2/2001 |
| EP | 1 145 631 | 10/2001 |
| EP | 1 306 326 | 5/2003 |
| EP | 0 892 254 B1 | 9/2003 |
| EP | 1 570 732 | 9/2005 |
| EP | 1 856 971 | 5/2007 |
| EP | 2 134 164 | 9/2008 |
| EP | 1 671 901 | 12/2008 |
| EP | 2 003 412 | 12/2008 |
| EP | 2 045 198 A1 | 4/2009 |
| EP | 2 377 787 A1 | 10/2011 |
| EP | 2 850 927 | 3/2015 |
| ES | 2449667 | 3/2014 |
| FR | 1129736 | 1/1957 |
| FR | 2030824 | 11/1970 |
| FR | 2322809 | 4/1977 |
| FR | 2483652 | 12/1981 |
| FR | 2780247 | 12/1999 |
| GB | 856296 | 12/1960 |
| GB | 1 021 571 | 3/1966 |
| GB | 1 022 509 | 3/1966 |
| GB | 1022509 | 3/1966 |
| GB | 1 237 284 | 8/1967 |
| GB | 1 406 164 | 4/1973 |
| GB | 2 047 649 | 12/1980 |
| GB | 2 080 663 | 2/1982 |
| GB | 2 086 593 | 5/1982 |
| GB | 2 125 756 | 8/1982 |
| GB | 2 226 130 | 6/1990 |
| JP | S4832580 | 4/1973 |
| JP | S 5889508 | 5/1983 |
| JP | 11079345 | 3/1999 |
| JP | 11139526 | 5/1999 |
| JP | 2000-235005 | 8/2000 |
| JP | 2001-27612 | 1/2001 |
| JP | 2001-287710 | 10/2001 |
| JP | 2003-346124 | 12/2003 |
| JP | 2007-175027 | 12/2007 |
| NL | 8002232 | 11/1981 |
| NL | 9400025 | 8/1995 |
| NL | 1037320 | 9/2009 |
| RU | 2129303 | 4/1999 |
| SU | 1483470 | 5/1989 |
| WO | 9743733 | 11/1997 |
| WO | 2004004319 | 1/2004 |
| WO | 2005 109111 A1 | 11/2005 |
| WO | 2009 092130 A1 | 7/2009 |
| WO | 2011 136 644 | 11/2011 |
| WO | 2012045622 | 4/2012 |

\* cited by examiner

FEEDING DEVICE FOR POULTRY ANIMALS

CROSS-REFERENCE TO FOREIGN PRIORITY APPLICATION

The present application claims the benefit under 35 U.S.C. § 119(b) of German Application No. DE 20 2016 105370.6 filed Sep. 27, 2016, titled "Feeding Device for Poulty Animals."

FIELD OF THE INVENTION

The invention relates to a feeding device to poultry animals and a process for feeding poultry animals.

BACKGROUND OF THE INVENTION

Feeding devices for poultry animals are known. The disadvantage of existing feeding devices is that space for the feeding device is limited and/or not easily accessible. Another disadvantage is that the feed is continuously soiled.

Therefore, it is an object of the existing invention to provide a feeding device for poultry animals and a process for feeding poultry animals that reduces or avoids one or more of the stated disadvantages. It is, in particular, an object of the present invention to provide a feeding device for poultry animals and a process for feeding poultry animals that facilitates the accessibility of the feed and/or allows improved feeding and/or reduction of soiling of the feed.

This object is solved by a feeding device for poultry animals comprised of an upper feed provision element with an elongated extension, at least one access platform, for example, a perch or grate, disposed so that poultry animals can reach the feed in the upper feed provision element from the access platform, at least one lower feed provision element disposed underneath the upper feed provision element during operation, wherein the lower feed provision element is disposed so that, during operation, poultry animals from the floor can reach the feed in the lower feed provision element, and wherein the lower feed provision element is disposed so that the lower feed provision element is supplied with feed provided in the upper feed provision element.

SUMMARY OF THE INVENTION

The feeding device for poultry animals comprises an upper feed provision element with an elongated extension, which during operation is essentially aligned horizontally. The upper feed provision element is preferably open to the top and arranged and designed so that poultry animals can consume the feed from the upper feed provision element.

Pursuant to the invention, an access platform is also provided from which poultry animals can reach the feed in the upper feed provision element. During operation, the upper feed provision element is preferably arranged at a distance from a floor, for example, a stable or aviary floor. This distance is preferably spaced so that poultry animals from the floor cannot reach the feed in the upper feed provision element but must first step onto the access platform to do so. Preferably, the access platform is also arranged at a distance from the floor. The access platform, for example, may be in the shape of a perch or a grate. Furthermore, an elongated extension of the access platform parallel to the elongated extension of the upper feed provision element is preferred. The access platform is preferably arranged above and/or laterally from the upper feed provision element.

Furthermore, during operation, a lower feed provision element is arranged underneath the upper feed provision element. This lower feed provision element may also feature an elongated extension, but may be designed significantly shorter in the direction of the elongated extension of the upper feed provision element.

The lower feed provision element is preferably open to the top and is arranged and designed so that during operation poultry animals can consume the feed from the lower feed provision element from the floor.

The feed in the lower feed provision element is provided by supplying the lower feed provision element from the upper feed provision element. This means, in particular, that feed provided in the lower feed provision element has initially been added to the upper feed provision element and from there reaches the lower feed provision element.

The feeding device pursuant to the invention has several advantages. On the one hand, the feeding device pursuant to the invention guarantees improved accessibility of the feed. In particular, a higher number of poultry animals can simultaneously consume feed, because additional poultry animals have access to the upper feed provision element due to the access platform, even if access to the lower feed provision element is already occupied by poultry animals located on the floor.

Furthermore, arranging the lower feed provision element during operation underneath the upper feed provision element protects the feed located in the lower feed provision element against soiling, because the upper feed provision element prevents or at least obstructs the ingress of soil into the lower feed provision element.

On the other hand, supplying the lower feed provision element from the upper feed provision element constitutes an increase of the feed offer to various feed provision elements without the need of providing additional or separate feed conveyor or feed supply systems for the lower feed provision element.

The upper feed provision element is preferably designed as a feeding trough. The lower feed provision element is furthermore preferably designed as a feed pan. A feed pan can essentially have a circular or oval horizontal diameter. The feed pan can, for example, be plate-shaped or bowl-shaped.

A preferred embodiment further provides that the lower feed provision element during operation is arranged at a height above a floor of an animal house at which poultry animals from the floor can reach feed supplied in the lower feed provision element.

In particular it is preferred that the upper feed provision element as well as the lower feed provision element are arranged at a distance from a floor of an animal house. The feeding device is preferably suspended from a ceiling or support structure in the animal house. In this manner, the floor may remain free and may, for example, be filled with litter.

A preferred embodiment provides that the lower feed provision element is connected to the upper feed provision element through a feed line. This feed line preferably serves to supply the lower feed provision element. The feed line is preferably arranged and designed to support the lower feed provision element and is attached to the upper feed provision element.

It is, in particular, preferred that the lower feed provision element is supplied from the upper feed provision element due to gravity. Furthermore, it is preferred that a connection to supply the lower feed provision element from the upper feed provision element can be opened or closed, for example by moving a locking element from an open to a closed position. Furthermore, it is preferably provided that at least one section of the feed line is designed as a hollow tube, in particular essentially as a vertically aligned downpipe.

It is, in particular, preferable that a bottom of the upper feed provision element features an opening in the area of the lower feed provision element. Furthermore, the opening in the bottom of the upper feed provision element is preferably connected to the feed line. In this manner, the lower feed provision element can be supplied particularly easily from the upper feed provision element due to gravity.

In another embodiment, a transversal to the elongated extension during operation comprises an essentially horizontal width of the upper feed provision element that is maximally 50% greater or smaller than a width of the lower feed provision element in the same direction. In particular it is preferred that a transversal to the elongated extension during operation comprises an essentially horizontal width of the upper feed provision element that is maximally 40%, and maximally 30%, and maximally 20%, or maximally 10% greater or smaller than a width of the lower feed provision element in the same direction. Limiting the different widths between the upper feed provision element and the lower feed provision element can in particular have a positive effect on protecting the feed in the lower feed provision element from soiling.

Another preferred embodiment provides that the upper feed provision element features a conveyor system to transport feed, in particular along the elongated extension. The transport system is preferably designed as a conveyor chain or conveyor spiral.

Furthermore, it is preferred that the feeding device comprises two or multiple access platforms, for example, perches or grates, for poultry animals. An access platform during operation is preferably arranged above the upper feed provision element. Preferably, an access platform during operation is essentially arranged at the height of the lower feed provision element. In particular, it is preferred that one access platform each is arranged on both longitudinal sides of the upper feed provision element. Furthermore, it is preferred that an elongated extension of the two or multiple access platforms is in a parallel direction to the elongated extension of the upper feed provision element.

In another preferred embodiment, the feeding device comprises two or multiple lower feed provision elements arranged underneath the upper feed provision element during operation. Preferably, all or some of these additional lower feed provision elements are designed as described herein. In particular, all lower feed provision elements could be designed in the same manner. However, it is also possible that individual lower feed provision elements or groups of lower feed provision elements differ from the others.

Pursuant to another aspect, the object stated above is solved by a process for feeding poultry animals, comprising: provision of a feeding device described herein; provision of feed in the upper feed provision element; supplying feed from the upper feed provision element to the lower feed provision element.

Pursuant to another aspect, the object stated above is solved by using one of the feeding devices described above to feed poultry animals.

Concerning the advantages, design variances, and design details of these further aspects of the invention and its possible embodiments, reference is made to the description provided herein of the respective features, as will be understood and appreciated by those skilled in the art upon studying the following specification, claims, and appended drawings concerning the relevant features of the feeding device.

BRIEF DESCRIPTION OF THE DRAWINGS

Preferential embodiments of the invention are described by way of example in the enclosed figures. The following is shown.

DETAILED DESCRIPTION OF THE PREFERRED EMBODIMENTS

Figure 1:
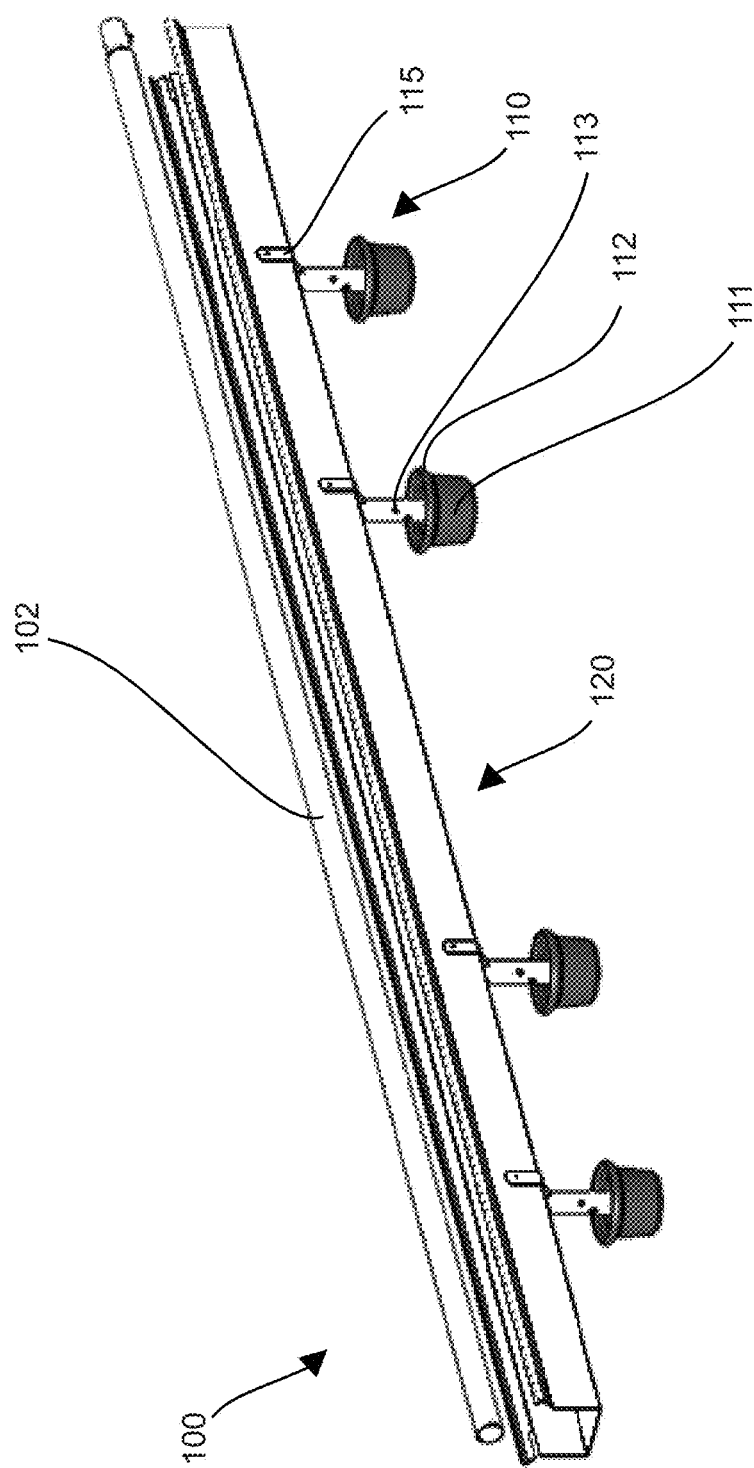
FIG. 1 is a three-dimensional view of an exemplary embodiment of a feeding device for poultry animals pursuant to the invention.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale. Equal or essentially functionally similar elements have the same reference numbers in the Figures.

Figure 2:
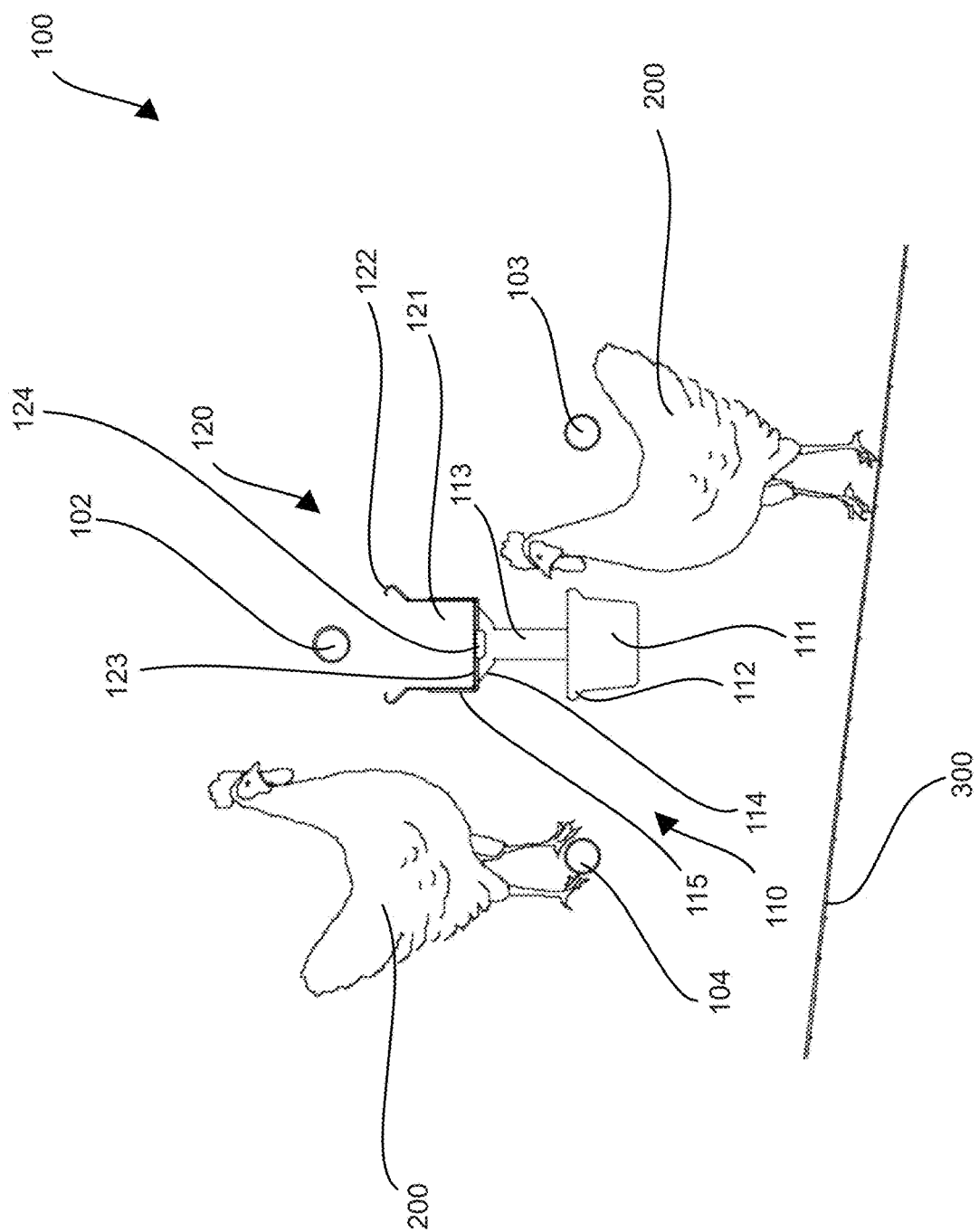
FIG. 2 is a cross section of another exemplary embodiment of a feeding device for poultry animals pursuant to the invention.

FIGS. 1 and 2 show a feeding device 100 for poultry animals 200 (only shown in FIG. 2) with an upper feed provision element designed as a feeding trough 120, essentially aligned horizontally with an elongated extension during operation. Underneath the feeding trough, FIG. 1 shows four lower feed provision elements (in the cross section in FIG. 2, only one lower feed provision element is discernible), which are designed as feed pans 110 in the form of bowls 111. The Figures only show a section of a feeding device 100. Fewer or significantly more than four feed pans 110 may be arranged in a feeding device 100. Furthermore, other configurations of the upper feed provision element and the lower feed provision element may be provided for.

The feeding trough 120 as well as the feed pans 110 are open to the top and are arranged and designed so that poultry animals 200 can consume the feed from them. The feeding trough 120 features an upper edge 122 widened toward the outside, and an interior space 121 in which the feed is provided. The feed may, for example, be provided by a conveyor spiral or a conveyor chain (not shown) in feeding trough 120. The feed pans feature an upper edge 112 widened slightly to the outside and an interior space in which the feed is provided. The feed lines 113 are widened in an upper area 114 and attached to feeding trough 120 with attachment elements 115. The feed pans 110 in turn are attached to the feed lines 113, preferably in a way that feed from the feed lines 113 can reach the feed pans 110. In this manner, the feed lines 113 support the feed pans 110 and suspend them from feeding trough 120.

The feed pans 110 are arranged and designed so that they are supplied with feed provided in feeding trough 120. For this, one feed line 113 essentially designed as a vertical downpipe is provided per feed pan 110. The bottom 123 of feeding trough 120 in the area of the feed lines 113 features openings 124, through which feed provided in feeding trough 120 can reach the feed pans 110 essentially due to gravity.

As is, in particular, discernible in FIG. 2, the feed pans 110 and the feeding trough 120 during operation are at a distance from the floor 300 of the animal house, here designed as a wire floor. Here, the feed pans 110 are arranged at a height above a floor 300 in which poultry animals 200 from the floor 300 can reach feed provided for in feed pans 110.

An essentially horizontal width of the feeding trough 120 aligned diagonally to the elongated extension during operation is maximally 20% smaller, preferably maximally 10% smaller than a width of feed pans 110 in the same direction.

The feeding device 100 features three access platforms in the form of perches 102, 103, 104 for poultry animals 200. A perch 102 during operation is arranged above the feeding trough 120 and is shown in both FIGS. 1 and 2. During operation, two additional perches 103, 104 (shown only in FIG. 2) are essentially arranged at the height of the feed pans 110. One perch 103, 104 each is arranged on both longitudinal sides of the main feeding trough 120. An elongated expansion of the three perches 102, 103, 104 is arranged parallel to the elongated extension of feeding trough 120.

The feeding device 100 has the advantage that a greater number of poultry animals 200 can reach the feed simultaneously. While poultry animals 200 located on the floor 300 can consume feed from the feeding pans 110 and occupy access to these feeding pans 110, additional poultry animals 200 located on the access platforms in the form of perches 102, 103, 104 can simultaneously access feed from feeding trough 120. In this manner, improved accessibility of the feed by a multitude of animals is guaranteed. The feeding device 100 furthermore has the advantage that additional feeding stations in the form of feed pans 110 are provided underneath feeding trough 120, which are supplied from feeding trough 120. Thus, in particular in case of a lack or scarcity of feeding space in a livestock facility, additional feed can quickly and easily be provided. The location of feed pans 110 under feeding trough 120 has the advantage that the feed on the lower level is not soiled by poultry animals sitting above it or soiling is reduced.

Furthermore, this arrangement facilitates improved activity of poultry. Even if a poultry animal stands on the upper access platform and eats on the upper feed provision element, the lower feed provision elements remain accessible. The lower feed provision elements are an excellent option specifically also for poultry animals with difficulties reaching an access platform or difficulties, e.g., sitting on a perch, because they are also accessible from the floor and it is therefore not necessary to reach an access platform or sit on a perch. The upper feed provision element as well as the lower feed provision element(s) therefore are permanently and simultaneously accessible for poultry animals. Therefore, feed can be offered on two levels while loading feed is possible via a joint conveyor system.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the afore-mentioned structure and method without departing from the concepts of the present disclosure, and further it is to be understood that such concepts are intended to be covered by the following claims unless these claims by their language expressly state otherwise.

The invention claimed is:

1. A feeding device for poultry animals, comprising:
an upper feed provision element comprising an elongated expansion;
at least one access platform disposed so that poultry animals can reach the feed in the upper feed provision element from the access platform; and
at least one lower feed provision element disposed underneath the upper feed provision element during operation, wherein the lower feed provision element is disposed so that, during operation, poultry animals can reach the feed in the lower feed provision element from a floor;
wherein the lower feed provision element is disposed so that the lower feed provision element is supplied with feed provided in the upper feed provision element.

2. The feeding device of claim 1, wherein the access platform comprises a perch or a grate.

3. The feeding device of claim 1, wherein the upper feed provision element is designed as a feeding trough.

4. The feeding device of claim 1, wherein the lower feed provision element is designed as a feed pan.

5. The feeding device of claim 1, wherein the lower feed provision element is connected to the upper feed provision element through a feed line.

6. The feeding device of claim 5, wherein at least one section of the feeding line comprises a hollow tube.

7. The feeding device of claim 1, wherein a bottom of the upper feed provision element proximate the lower feed provision element comprises an opening.

8. The feeding device of claim 1, wherein a transversal to the elongated extension comprises an essentially horizontal width of the upper feed provision element is maximally 50% larger or smaller than a width of the lower feed provision element in the same direction.

9. The feeding device of claim 1, wherein the upper feed provision element comprises a conveyor system to transport feed.

10. The feeding device of claim 9, wherein the conveyor system extends along the elongated extension.

11. The feeding device of claim 9, wherein the conveyor system comprises a conveyor chain or conveyor spiral.

12. The feeding device of claim 1, further comprising two or multiple access platforms for poultry animals.

13. The feeding device of claim 12, wherein the multiple access platforms comprise perches.

14. The feeding device of claim 1, further comprising two or multiple lower feed provision elements, during operation, disposed underneath the upper feed provision element.

15. A method for feeding poultry animals, comprising the step of:
providing a feeding device for poultry animals, the feeding device further comprising:
an upper feed provision element with an elongated expansion;
at least one access platform disposed so that poultry animals can reach the feed in the upper feed provision element from the access platform; and
at least one lower feed provision element arranged underneath the upper feed provision element during operation, wherein the lower feed provision element disposed so that, during operation, poultry animals can reach the feed in the lower feed provision element from a floor, wherein the lower feed provision element is disposed so that the lower feed provision element is supplied with feed provided in the upper feed provision element; and
further comprising the step of providing a supply of feed in the upper feed provision element;
wherein the supply of feed moves from the upper feed provision element to the lower feed provision element.

16. Use of a feeding device pursuant to claim 15 to feed poultry animals.

* * * * *